(12) United States Patent
Pirhonen

(10) Patent No.: US 7,106,293 B2
(45) Date of Patent: Sep. 12, 2006

(54) LIGHTING CONTROL METHOD AND ELECTRONIC DEVICE

(75) Inventor: Risto Pirhonen, Tampere (FI)

(73) Assignee: Nokia Corporation, Espoo (FI)

( * ) Notice: Subject to any disclaimer, the term of this patent is extended or adjusted under 35 U.S.C. 154(b) by 422 days.

(21) Appl. No.: 10/294,220

(22) Filed: Nov. 14, 2002

(65) Prior Publication Data
US 2003/0095093 A1    May 22, 2003

(30) Foreign Application Priority Data
Nov. 19, 2001    (FI) .................................. 20012246

(51) Int. Cl.
G09G 3/36    (2006.01)
G02F 1/1335    (2006.01)

(52) U.S. Cl. ........................................ 345/102; 349/61
(58) Field of Classification Search ................ 345/204, 345/205, 207, 87–102, 76, 82, 83; 349/60–71
See application file for complete search history.

(56) References Cited

U.S. PATENT DOCUMENTS

| | | | |
|---|---|---|---|
| 5,384,577 A | | 1/1995 | McLaughlin et al. |
| 5,490,005 A | * | 2/1996 | Jueliger ........................ 349/116 |
| 5,760,760 A | * | 6/1998 | Helms .......................... 345/102 |
| 5,818,553 A | * | 10/1998 | Koenck et al. ................. 349/61 |
| 5,933,089 A | * | 8/1999 | Katada ......................... 340/7.55 |
| 6,447,132 B1 | * | 9/2002 | Harter, Jr. ...................... 362/29 |
| 2002/0050974 A1 | * | 5/2002 | Rai et al. ...................... 345/102 |

FOREIGN PATENT DOCUMENTS

| | | |
|---|---|---|
| EP | 1 085 731 | 3/2001 |
| EP | 1 107 222 | 6/2001 |
| EP | 1 202 243 | 5/2002 |
| JP | 6130386 | * 5/1994 |
| JP | 06130386 | 5/1994 |
| JP | 11282404 | * 10/1999 |
| WO | WO 99/23456 | 5/1999 |

* cited by examiner

*Primary Examiner*—Alexander Eisen
(74) *Attorney, Agent, or Firm*—Hollingsworth & Funk, LLC

(57) ABSTRACT

A lighting control method and an electronic device. The lighting of the display of the device can be adjusted according to ambient lighting. Information on the ambient lighting is transmitted to a light-sensitive component of the device through a light guide that is integrated as part of a protective display window.

15 Claims, 1 Drawing Sheet

LIGHTING CONTROL METHOD AND ELECTRONIC DEVICE

BACKGROUND OF THE INVENTION

The invention relates to a method for controlling the lighting of a display in an electronic device, in which method ambient light is led to a light-sensitive component of the device through a light guide, the light-sensitive component controlling a display illuminator lighting the display on the basis of the ambient light.

Further, the invention relates to an electronic device that comprises a display element, a protective display window arranged to protect the display element, at least one display illuminator, a light-sensitive component arranged to control the illuminance of the illuminator on the basis of ambient light, a light guide leading ambient light from the surroundings of the device to said light-sensitive component.

The electronic devices—later in this application referred to as 'device'—mentioned in this application are typically for instance mobile stations, such as mobile phones or communicating devices, or electronic games, combinations of the above or other corresponding devices. What said devices have in common is a display, for instance liquid crystal display, that is lighted by a background light, front light or both. The lighting of the display is intended to improve the clarity and visibility of the display in different lighting conditions.

Arrangements are known, in which the lighting intensity can adjust itself automatically according to the ambient light, thus providing automatically optimal display lighting in different lighting conditions. In these arrangements, ambient lighting is typically detected by a component reacting in some manner to a change in lighting. Such light-sensitive components include light emitting diodes, phototransistors and photoresistors. Such a component—later referred to as light-sensitive component—is usually quite vulnerable and, therefore, it is preferably fitted inside the device. A light guide is arranged between the light-sensitive component and the outer surface of the device, through which ambient light enters the light-sensitive component. The light-sensitive component reacts to the ambient lighting conditions on the basis of the light coming through the light guide, and adjusts the display lighting.

A problem with the arrangement described above is that the light guide is a small and transparent component and very difficult to handle in production and the assembly of the device. The light guide requires fastening elements for fastening it to the device and a work stage, during which the light guide is fastened to these fastening elements. In addition, the light guide requires a seal for sealing the joint surface between the light guide and the device casing against moisture and dust. For said reasons, costs accrue from the light guide during component manufacture as well as device assembly. Yet another prior-art problem is that the air gap between the light guide and the rest of the device reduces the ESD (electrostatic discharge) shielding: an ESD spark can enter the device through the gap, thus endangering the electric components of the device.

U.S. Pat. No. 5,384,577 discloses a different type of solution, in which a liquid crystal display is lighted by an electroluminescent panel fitted behind it. The electroluminescent panel also has a second function: it serves as a light-sensitive component that detects ambient lighting and switches the display lighting on when the ambient lighting is below a certain limit value. Such a solution is quite expensive and complex.

BRIEF DESCRIPTION OF THE INVENTION

It is an object of the invention to develop a method and a device implementing it so as to solve the above-mentioned problems.

The method of the invention is characterized in that the light guide is integrated as part of the protective display window.

The electronic device of the invention is characterized in that the light guide is integrated as part of the protective display window.

The essential idea of the invention is that the light guide is integrated as part of the protective display window.

The invention provides the advantage that its implementation is simple and the space required by its structure is small, because no separate fastening structures of the light guide are needed. The handling of the light guide is substantially easier than before. The light guide does not cause joint surfaces that need to be sealed to the casing of the device. For the same reason, the ESD shielding of the device is better than before. The assembly stage of the device becomes simpler and less expensive, because no handling stages or installation stages of a separate light guide are needed, nor any handling means or tools for them. The light guide also increases the sensitivity of the light-sensitive component, and it can be used to adjust the angle, at which ambient light is measured.

BRIEF DESCRIPTION OF THE FIGURES

The invention will now be described in more detail by means of preferred embodiments and with reference to the attached drawings, in which.

DETAILED DESCRIPTION OF THE INVENTION

Figure 1:
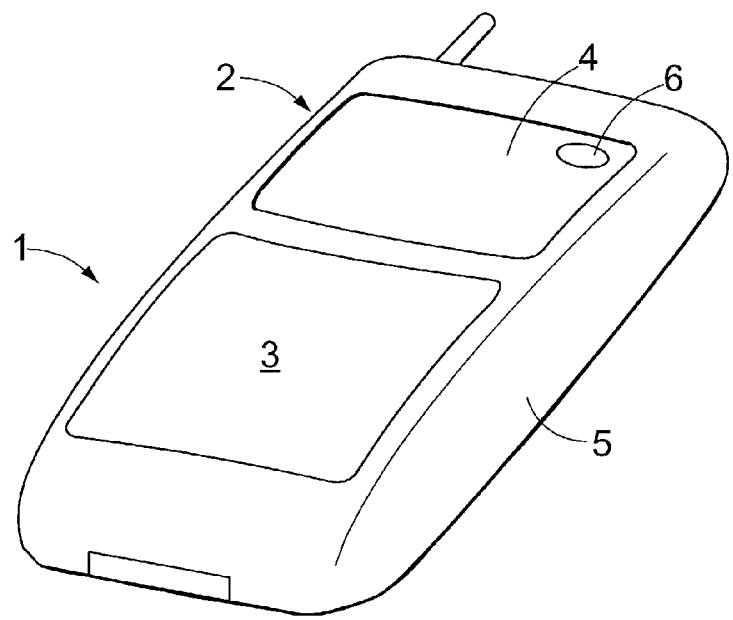
FIG. 1 is a schematic representation of an embodiment of the electronic device of the invention in perspective.

FIG. 1 is a schematic representation of an embodiment of the electronic device of the invention in perspective. In this application, the electronic device refers to mobile stations, such as mobile phones and communicating devices, and electronic games or the like. They are devices known per se by a person skilled in the art, so they will not be described in more detail herein.

The device 1 comprises a display 2 and operating means 3 of the device that typically comprise a keyboard and/or different function keys. In the presented embodiment, the display 2 is a liquid crystal display, but its operation can also be based on some other display solution known per se. The display 2 can also be a touch screen.

The display 2 is arranged underneath a protective display window 4–later window 4. The window 4 covers an opening made into the casing 5 of the device for the display 2 and protects a display element from physical and chemical damage. It also prevents dirt, dust and moisture from entering inside the display 2 and device 1.

The window 4 is fastened to the casing 5. Alternatively, it can also be fastened to the body of the device, which has not been shown in the figure for the sake of simplicity, or to the display element that will be described in more detail in connection with FIG. 3. The window 4 is made of a material that substantially transmits visible light, i.e. of a transparent material. The material is usually an amorphous thermoplastic, such as polymethyl-methacrylate (PMMA), polycarbonate (PC) or the like. A light guide 6 is integrated to the window 4 and will be described in more detail in connection with the following figures.

Figure 2:
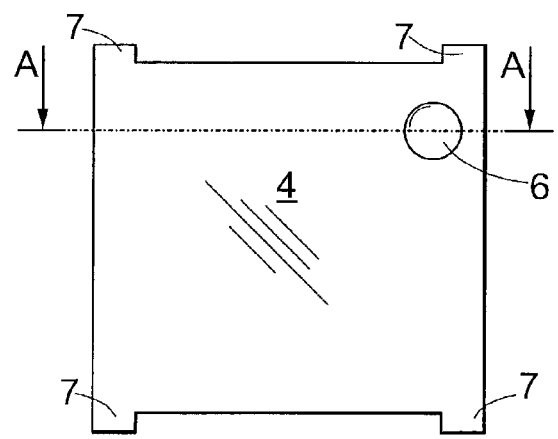
FIG. 2 is a schematic representation of the protective display window of the electronic device of FIG. 1 from the top.

FIG. 2 is a schematic top view of the protective display window of the electronic device of FIG. 1. The window 4 is made of a substantially transparent material by injection-moulding, for instance, that is a quick and often used large-scale production method.

The light guide 6 is integrated to the window 4. In this application, the term 'integrate' refers to the fact that the light guide 6 is a part of the window 4 in the device 1 or the protective window 4: for manufacturing reasons, the light guide 6 and the window 4 can be made, for instance injection-moulded, as separate shaped pieces that are then fastened to each other by gluing or welding, for instance, to make one shaped piece. The window 4 and the light guide 6 integrated to it are preferably made as one shaped piece.

In the presented embodiment, the cross-profile of the light guide 6 is substantially circular and the light guide is located on the edge of the window 4. The shape of the cross-profile of the guide 6 can naturally be some other shape, and the light guide can be located in another section of the window 4. The window 4 typically also has other functional parts, such as fastening elements 7 for fastening the window in place in the device 1.

Figure 3:
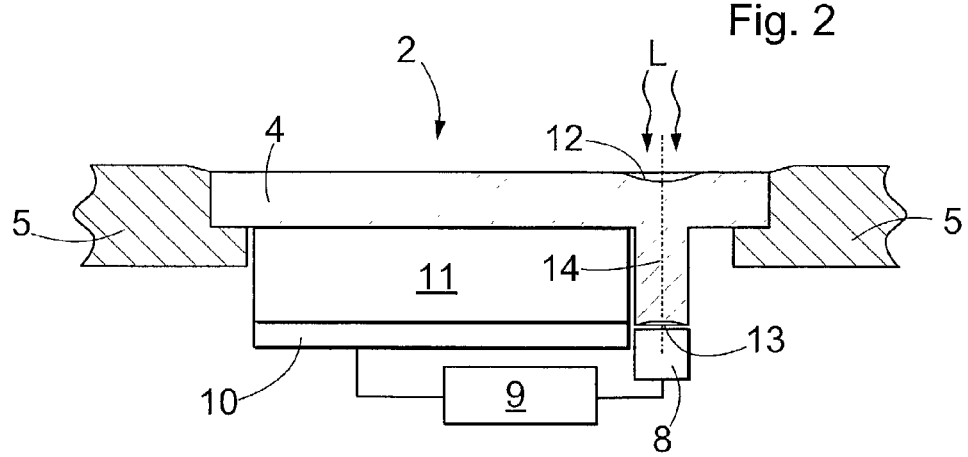
FIG. 3 is a schematic representation of the protective display window of FIG. 2 as a cutaway diagram A—A.

FIG. 3 is a cutaway diagram A—A of FIG. 2. The window 4 is fastened substantially in a dust- and watertight manner to the casing 5 of the device by gluing, for instance. Under the window, a display element 11 is fitted that forms the actual visual information of the display 2. The display element 11 is now a liquid crystal element, but it can be based on any other display technology known per se. In a second embodiment of the invention, the window 4 is fastened to the display element 11.

To light the display element 11, the display 2 comprises a display illuminator 10. The illuminator 10 lights the display element 11 from the back, i.e. the display 2 has background lighting. The display lighting can also be arranged as front lighting or a combination of background and front lighting. The display illuminator 10 is a LED, for instance, or any other corresponding illuminator known per se. For instance in mobile stations, an appropriate display lighting is implemented by relatively small and energy-efficient components, such as LEDs. A light-emitting illuminator can be arranged in the device 1 in other ways than next to the display 2 and the light led to the display element 11 with other light guides.

The light guide 6 is integrated as part of the window and extends from the outward-facing side of the window 4 to the inward-facing side of the window. The light guide 6 has a first end 12 arranged on the outward-facing side of the window 4 and a second end 13 arranged on the inward-facing side of the window 4, i.e. inside the device 1. The optical axis 14 of the light guide 6 is arranged perpendicular to the window plane. The light L entering the first end 12 of the light guide from the surroundings of the device is transmitted through the light guide 6 to the second end 13 of the guide. The guide 4—including its both ends 12, 13—is designed in such a manner that the necessary indication of the ambient lighting and a change in it are obtained from the light exiting the second end 13 of the guide 4.

A light-sensitive component 8 is arranged in immediate proximity to the second end 13 of the light guide 4, on the optical axis 14 of the guide to measure the ambient lighting on the basis of the light from the guide 6. On the basis of the light from the guide 6, the light-sensitive component 8 generates a signal proportional to the ambient light that is transmitted to control electronics 9 of the display lighting. The control electronics 9 adjusts the illuminance of the display illuminator 10 and can even disconnect the lighting entirely. The light-sensitive components 8 and the control electronics 9 are known per se to a person skilled in the art and, therefore, are not described in more detail herein. The light-sensitive component 8 is for instance a light-emitting diode, phototransistor, photoresistor or any other corresponding component known per se.

The length of the guide 6 is arranged to be such that the second end 13 is at an optimal distance from the light-sensitive component 8; in some embodiments, the second end 13 is in contact with the light-sensitive component 8.

Because the guide 6 is integrated as part of the window 4, the very small guide need not be handled separately during the assembly of the device 1, for instance. Any fastening elements of the guide are also unnecessary, because the guide fastens to the device 1 at the same time when the window 4 is fastened by the fastening elements 7. There is no surface to be sealed and needing a sealing between the guide 6 and the window 4 or the guide 6 and the device casing 5. The integration of the window 4 and light guide 6 reduces considerably the number of components connected to the guide 6 and substantially facilitates the assembly work related to the guide 6.

It is apparent to a person skilled in the art that while the technology advances, the basic idea of the invention can be implemented in many different ways. The invention and its embodiments are thus not restricted to the examples described above, but can vary within the scope of the claims. Thus, the light guide 6 can be arranged and designed in such a manner that its optical axis is not perpendicular to the plane of the window 4; in other words, the angle at which the ambient light is measured can be adjusted. The light guide 6 can be made of a different material than the window 4. This is possible by using a two-component injection-moulding method, for instance, or by manufacturing the window 4 and the guide 6 as separate shaped pieces and fastening them together as one piece. The device casing 5 can also be shaped in such a manner that the first end 12 of the light guide 6 and the actual display 2 and the section of the window 4 protecting it are arranged in separate casing 5 openings. The window 4 can also have several light guides 6. The light guide 6 can alternatively be integrated to the device casing.

The invention claimed is:

1. A method for controlling the lighting of a display in an electronic device, in which method
   ambient light is led to a light-sensitive component of the device through a light guide,
   the light-sensitive component controlling a display illuminator that lights the display on the basis of the ambient light,
   wherein the light guide is integrated as part of a protective display window and configured to communicate light in a manner differing from that of other portions of the protective display window.

2. A method as claimed in claim 1, wherein the protective display window and the light guide are manufactured as one shaped piece.

3. A method as claimed in claim 1, wherein a display element is a liquid crystal element.

4. A method as claimed in claim 1, wherein the display illuminator is arranged as a background light.

5. A method as claimed in claim 1, wherein the electronic device is a mobile station.

6. A method as claimed in claim 1, wherein the light guide comprises a second end defined relative to an inward-facing side of the protective display window, the second end extending a distance from the inward-facing side of the protective display window.

7. An electronic device comprising:
   a display element,
   a protective display window arranged to protect the display element,
   at least one display illuminator,
   a light-sensitive component that is arranged to control the illuminance of the illuminator on the basis of the ambient light,
   a light guide that transmits the ambient light from the surroundings of the device to said light-sensitive component,
   wherein the light guide is integrated as part of the protective display window and configured to communicate light in a manner differing from that of other portions of the protective display window.

8. An electronic device as claimed in claim 7, wherein the protective display window and the light guide are manufactured as one shaped piece.

9. An electronic device as claimed in claim 7, wherein the display element is a liquid crystal element.

10. An electronic device as claimed in claim 7, wherein the display illuminator is arranged as a background light.

11. An electronic device as claimed in claim 7, wherein the electronic device is a mobile station.

12. An electronic device as claimed in claim 7, wherein the light guide comprises a second end defined relative to an inward-facing side of the protective display window, the second end extending a distance from the inward-facing side of the protective display window.

13. A display module comprising:
   a display element,
   a protective display window arranged to protect the display element,
   at least one display illuminator,
   a light-sensitive component that is arranged to control the illuminance of the illuminator on the basis of the ambient light,
   a light guide that transmits the ambient light from the surroundings of the device to said light-sensitive component,
   wherein the light guide is integrated as part of the protective display window, and wherein the light guide is shaped to transmit ambient light to the light-sensitive component in a manner differing from the other parts of the protective display window.

14. A display module as claimed in claim 13, wherein the protective display window and the light guide are manufactured as one shaped piece.

15. A display module as claimed in claim 13, wherein the light guide comprises a second end defined relative to an inward-facing side of the protective display window, the second end extending a distance from the inward-facing side of the protective display window.

* * * * *